US009629296B2

(12) United States Patent
Aposhian et al.

(10) Patent No.: US 9,629,296 B2
(45) Date of Patent: Apr. 25, 2017

(54) SOD HARVESTER CHOP MECHANISM HAVING POSITION BASED SPEED CONTROL

(71) Applicants: Steven R. Aposhian, Farmington, UT (US); Eric E. Aston, Farmington, UT (US); William M. Decker, Salt Lake City, UT (US); Samuel H. Drake, Cottonwood Heights, UT (US)

(72) Inventors: Steven R. Aposhian, Farmington, UT (US); Eric E. Aston, Farmington, UT (US); William M. Decker, Salt Lake City, UT (US); Samuel H. Drake, Cottonwood Heights, UT (US)

(73) Assignee: Firefly Automatix, Inc., North Salt Lake, UT (US)

( * ) Notice: Subject to any disclaimer, the term of this patent is extended or adjusted under 35 U.S.C. 154(b) by 315 days.

(21) Appl. No.: 14/625,530

(22) Filed: Feb. 18, 2015

(65) Prior Publication Data

US 2016/0234990 A1    Aug. 18, 2016

(51) Int. Cl.
*A01B 45/04*    (2006.01)

(52) U.S. Cl.
CPC .................................. *A01B 45/04* (2013.01)

(58) Field of Classification Search
CPC ...... A01B 45/04; A01B 45/045; A01G 1/002; Y10S 414/12
USPC ............ 172/19, 20, 101, 125; 198/411, 427; 414/792, 792.1, 789.7
See application file for complete search history.

(56) References Cited

U.S. PATENT DOCUMENTS

| | | | | |
|---|---|---|---|---|
| 3,913,682 A * | 10/1975 | Kaercher, Jr. | .......... | A01B 45/04 172/101 |
| 5,626,195 A * | 5/1997 | Dover | .................. | A01B 45/045 172/19 |
| 6,244,354 B1 * | 6/2001 | Van Vuuren | ......... | A01B 45/045 172/19 |
| 6,527,502 B2 * | 3/2003 | Leijenaar | .............. | A01B 45/045 172/19 |
| 6,769,495 B1 * | 8/2004 | Van Loen | ............ | A01B 45/045 172/19 |
| 7,264,063 B1 * | 9/2007 | Dover | ..................... | A01B 45/04 172/2 |
| 7,721,814 B2 * | 5/2010 | Brouwer | .............. | A01B 45/045 172/20 |
| 8,235,131 B2 * | 8/2012 | Brouwer | .............. | A01B 45/045 172/20 |

(Continued)

*Primary Examiner* — Robert Pezzuto
(74) *Attorney, Agent, or Firm* — Brian Tucker; Kirton McConkie

(57) ABSTRACT

A chop mechanism for a sod harvester can include a motor for rotating a cam to lift a chop frame. The cam can include a ready position in which it remains until a chopping action is started. The cam can be rotated from the ready position to a drop position in which the cam no longer supports a follower mounted to the chop frame. After the cam reaches the drop position, the rotation of the cam can be stopped to position the cam in a safe position to prevent the follower from striking the cam as the chop frame descends. Then, rotation of the cam can be resumed to return the cam to the ready position to await the next chopping action. The rotation of the cam from the ready position to the safe position and from the safe position to the ready position can be performed at different rates.

20 Claims, 8 Drawing Sheets

(56) References Cited

U.S. PATENT DOCUMENTS 8,978,779 B2 * 3/2015 Aposhian ............... A01B 45/04
172/19

* cited by examiner

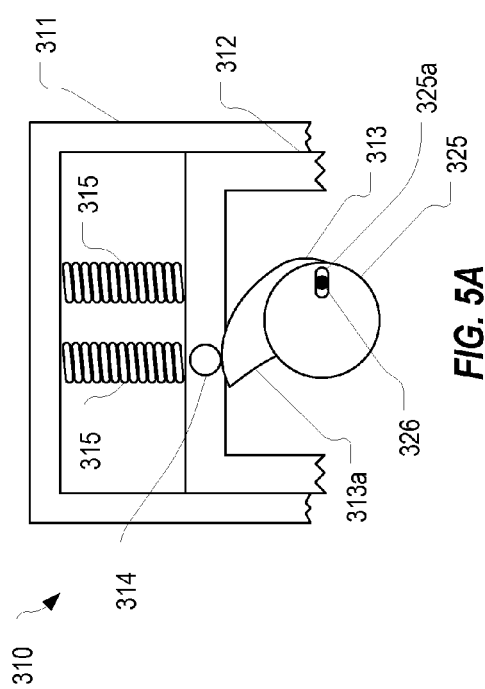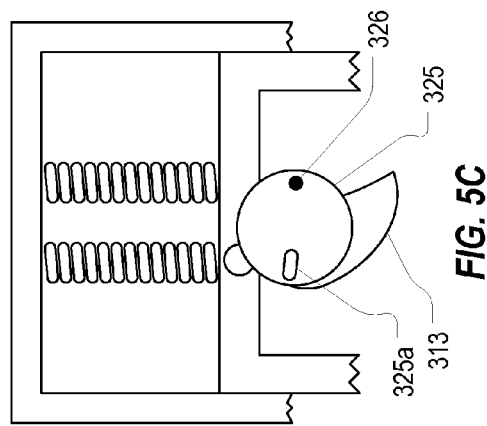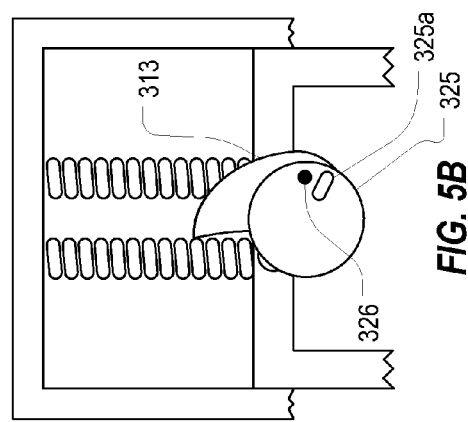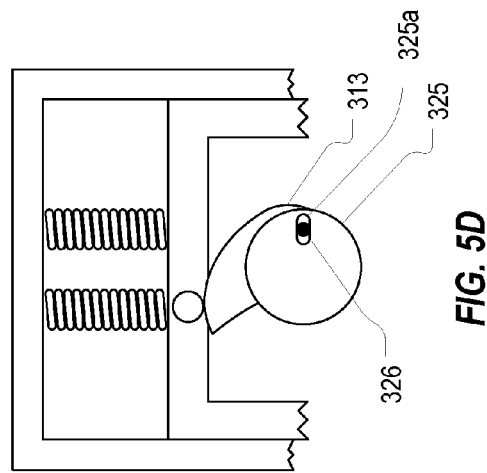
FIG. 5A
FIG. 5B
FIG. 5C
FIG. 5D

SOD HARVESTER CHOP MECHANISM HAVING POSITION BASED SPEED CONTROL

CROSS-REFERENCE TO RELATED APPLICATIONS

N/A

BACKGROUND

Turf grass (sod) is a living organism that must be handled properly to ensure its survival when it is removed from one location and transplanted to another. Sod is generally harvested using large machinery that cuts slabs of sod from the soil and stacks them on pallets.

FIG. 1 illustrates a portion of a sod harvesting machine 100 that includes a typical cutting head, conveyor system, and stacking system. The cutting head of FIG. 1 includes a chop mechanism 110, an oscillating blade 103, and a roller 104. Chop mechanism 110 is configured to periodically descend into the sod 151 to make vertical cuts defining an initial width/length of the slabs. Oscillating blade 103 oscillates back and forth underneath the sod to sever the slab from the underlying soil 150. Roller 103 applies pressure to the sod as it is cut to facilitate the cutting of clean slabs. Slabs cut by the cutting head are routed to conveyor 101 which lifts the slabs up to conveyor 102 from which they are removed for stacking on a pallet.

Different types of chop mechanisms 110 exist. One common type of chop mechanism employs a drop (or snail) cam. An example of a chop mechanism 210 that employs a drop cam is shown in FIGS. 2A-2D. Chop mechanism 210 includes a chop frame 212 which houses a blade (not shown). Chop frame 212 is configured to slide within a fixed frame 211 between a loaded (or upward) position and a chopping (or downward) position as illustrated by the sequence in FIGS. 2A-2D. Springs 215 are used to load chop frame 212 for a chopping action.

To cause chop frame 212 to perform this chopping action, cam 213 and follower 214 are employed. Follower 214 is mounted to chop frame 212 in a position that causes the follower to be lifted up as cam 213 rotates in a clockwise direction. Lifting chop frame 212 compresses springs 215 thereby loading the chop frame for the chopping action. Due to the flat edge 213a (or snail shape) of cam 213, follower 214 will be dropped after it has been lifted to its highest position. The blade of chop frame 212 will therefore be thrust into the ground once follower 214 is dropped due to the force caused by springs 215 as they return to their unloaded position. After chop frame 212 has descended into the ground, the rotation of cam 213 lifts follower 214 to apply an upward force to withdraw the blade from the ground thereby allowing the sod harvester to continue moving forward during the chopping action.

FIGS. 2A-2D illustrate a sequence of positions through which chop mechanism 210 travels during the chopping action. In FIG. 2A, cam 213 is shown in a ready (or loaded) position. Cam 213 has reached this ready position by rotating clockwise until follower 214 is adjacent to flat edge 213a. In the ready position, chop frame 212 is elevated thereby loading springs 215 and preparing the chop frame to descend into the ground. Although not shown, a latch is typically used to prevent cam 213 from rotating in a reverse direction (i.e., counter-clockwise) once it has reached this ready position.

In some designs, chop mechanism 210 can include means for identifying a distance that the sod harvester has travelled. In such cases, these means can control the advancement of cam 213 from the ready position shown in FIG. 2A to the chopping position shown in FIG. 2B. For example, a sensor may be employed to cause cam 213 to commence rotating from the ready position when it is determined that the sod harvester has travelled a distance equal to the desired length or width of a slab.

Cam 213 can continue to rotate to cause follower 214 to be lifted back towards the ready position as is shown in FIG. 2C. This rotation will cause cam 213 to again reach the ready position as shown in FIG. 2D.

The timing at which cam 213 rotates to the "drop point" (i.e., the position at which cam 213 no longer supports follower 214) determines the length/width of the slabs of sod. Typically, it is desirable that the slabs have a uniform length/width, and therefore, this timing is important. However, it can be very difficult to accurately and repeatedly control the rotation of cam 213 to the drop point.

In particular, a hydraulic motor is typically employed to drive cam 213. With hydraulic motors, there is a delay between the moment when the motor is turned on and the moment when the cam commences rotating. The length of this delay is influenced by various factors including the amount of time it takes to open a valve to allow fluid to commence flowing, and the amount of time it takes for the fluid pressure to build to a point that it exceeds the resting inertia of the cam. Another factor that influences the timing is the amount of time it takes for the hydraulic motor to reach full speed. In other words, once the motor is turned on, the hydraulic pressure will increase at some rate. Accordingly, when designing a control unit for controlling the rotation of cam 213, the designer must account for these delays so that the motor can be turned on in anticipation of the sod harvester reaching the location where a chopping action should be performed.

In addition to the timing for moving from the ready position to the drop point, the timing for reaching the ready position is also important. As with turning the motor on, there are also delays between the time when the motor is turned off and when the cam stops rotating. These delays must be taken into account when rotating the cam to the ready position. An error in this timing can result in the cam overrunning the ready position. If the overrunning is sufficient to rotate the cam to the drop point, a chopping action will occur too soon resulting in the slab being too short. On the other hand, if the overrunning does not cause the cam to reach the drop point, the cam will reverse direction due to the loaded springs until it slams against the latch. This can lead to early latch failure and increased wear on the cam and other components of the chop mechanism.

In contrast, if the motor is turned off too soon so that the cam does not reach the ready state (or at least the point where the latch engages to prevent reverse rotation), the cam may be allowed to rotate freely in the reverse direction until the springs are unloaded.

To address these timing issues, a controller can be used to control the rotation of the cam. Such controllers are typically programmed to employ timing offsets to account for the delays inherent in a hydraulic system. However, even when employing a controller, it can still be difficult to achieve uniform slab lengths/widths. A primary reason for this difficulty is that the delays inherent in such chop mechanisms are dependent on operating and environmental conditions. For example, as the hydraulic fluid's temperature increases, its density and viscosity decrease. Therefore, the delays present when turning the motor on or off vary with the temperature of the hydraulic fluid. Similarly, wear on the hydraulic components can alter the pressures of the hydraulic fluid resulting in changes in the delays over time.

When the ground speed of the sod harvester is slow, the variations in the timing delays are oftentimes inconsequential. For example, when the sod harvester is moving slowly, a slightly increased delay in reaching the drop point will not cause the slab to be substantially longer than expected. In contrast, if the sod harvester is operated at a relatively fast ground speed, a seemingly insignificant variation in the timing of reaching the drop point may result in the slab having a width/length that unsatisfactorily exceeds the dimensions of the pallet.

Further, even without such variations, these timing delays can limit the rate at which a sod harvester can be operated. The frequency of the chopping action is dependent on the ground speed of the sod harvester and the desired length/width of the slab. This frequency is limited by the delays of starting and stopping the motor. In particular, the frequency of the chopping action is limited by the amount of time it takes to rotate the cam from the ready position, to the drop position, and then back to the ready position. As stated above, there is a first delay when commencing the rotation from the ready position and a second delay when stopping the rotation to again reach the ready position. The combination of these delays, along with the actual time required to rotate the cam, limit the harvesting rate.

In summary, with existing chop mechanism designs that employ hydraulic motors, it is very difficult to achieve precise timing of the chopping action, and this difficulty increases as the rate of the chopping action increases. This difficulty is a primary limitation to the rate at which sod can be harvested.

Accordingly, there is a need for a chop mechanism design that is simple yet capable of being operated at high rates. In particular, there is a need for a chop mechanism design that would allow a sod harvester to be operated at high ground speeds while cutting slabs of relatively short length/width in a precise manner.

BRIEF SUMMARY

The present invention extends to a chop mechanism for a sod harvester and methods for controlling the chop mechanism. A chop mechanism in accordance with embodiments of the present invention can include a motor for rotating a cam to lift a chop frame. The cam can include a ready position in which it remains until a chopping action is to be started. The cam can be rotated from the ready position to a drop position in which the cam no longer supports a follower mounted to the chop frame. After the cam reaches the drop position, the rotation of the cam can be stopped to position the cam in a safe position to prevent the follower from striking the cam as the chop frame descends. Then, rotation of the cam can be resumed to return the cam to the ready position to await the next chopping action. The rotation of the cam from the ready position to the safe position and from the safe position to the ready position can be performed at different rates. In this way, the chopping action can be performed at high frequencies.

To facilitate the precise rotation of the cam between the ready and safe positions, a control unit can be configured to receive positional information that represents a current position of the cam. The control unit can employ this positional information to appropriately advance the cam during the chopping action.

In some embodiments, the accuracy with which the cam can be advanced is improved by employing one or more sensors to identify one or more operating parameters of the chop mechanism. For example, a control unit can be configured to monitor the temperature of the hydraulic fluid of a hydraulic motor used to drive the cam. Based on this temperature, the control unit can calculate appropriate timing offsets to employ when starting and stopping the rotation of the cam. In this way, the present invention can account for variations in the delays of a hydraulic motor caused by variations in the temperature of the hydraulic fluid. Alternatively, a control unit can be configured to calculate the current delays during operation of the motor and can dynamically adjust the timing offsets to account for the current delays.

In one embodiment, the present invention is implemented as a chop mechanism for a sod harvester comprising: a fixed frame; a chop frame that is configured to move within the fixed frame, the chop frame including a blade that inserts into the ground as the chop frame moves within the fixed frame; a follower secured to the chop frame; a cam positioned to contact the follower as the cam is rotated thereby lifting the chop frame, the cam including a flat edge which causes the follower to be dropped when the cam is rotated to a drop position, the cam having a ready position in which the cam is positioned prior to a chopping action and a safe position in which the follower will not strike the cam while the follower descends during the chopping action; a motor for rotating the cam; and a control unit configured to receive position information identifying a rotational position of the cam, the control unit further being configured to employ the position information to generate a first control signal to cause the cam to rotate from the ready position to the safe position, and a second control signal to cause the cam to rotate from the safe position to the ready position.

In another embodiment, the present invention is implemented as a chop mechanism for a sod harvester comprising: a fixed frame; a chop frame that is configured to move within the fixed frame, the chop frame including a blade that inserts into the ground as the chop frame moves within the fixed frame; a follower secured to the chop frame; a cam positioned to contact the follower as the cam is rotated thereby lifting the chop frame, the cam including a flat edge which causes the follower to be dropped when the cam is rotated to a drop position; an electric motor for rotating the cam; and a control unit configured to output control signals for controlling the rotation of the electric motor based on a position of the cam.

In another embodiment, the present invention is implemented as a method by which a control unit of a sod harvester controls the rotation of a cam during a chopping action, the method comprising: receiving a first signal indicative of the cam being in a ready position; receiving a second signal indicative of a ground position of the sod harvester; generating a first control signal for controlling a motor used to drive the cam, the first control signal causing the motor to rotate the cam through a drop position in which a follower is dropped by the cam to a safe position in which the follower will not strike the cam as the follower drops; and generating a second control signal for controlling the motor, the second control signal causing the motor to rotate the cam from the safe position to the ready position.

This summary is provided to introduce a selection of concepts in a simplified form that are further described below in the Detailed Description. This Summary is not intended to identify key features or essential features of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 5A-5D illustrate how a sensor can be used to identify a rotational position of the cam and how this rotational position can be used to advance the motor in a variable manner;

DETAILED DESCRIPTION

Figure 1:
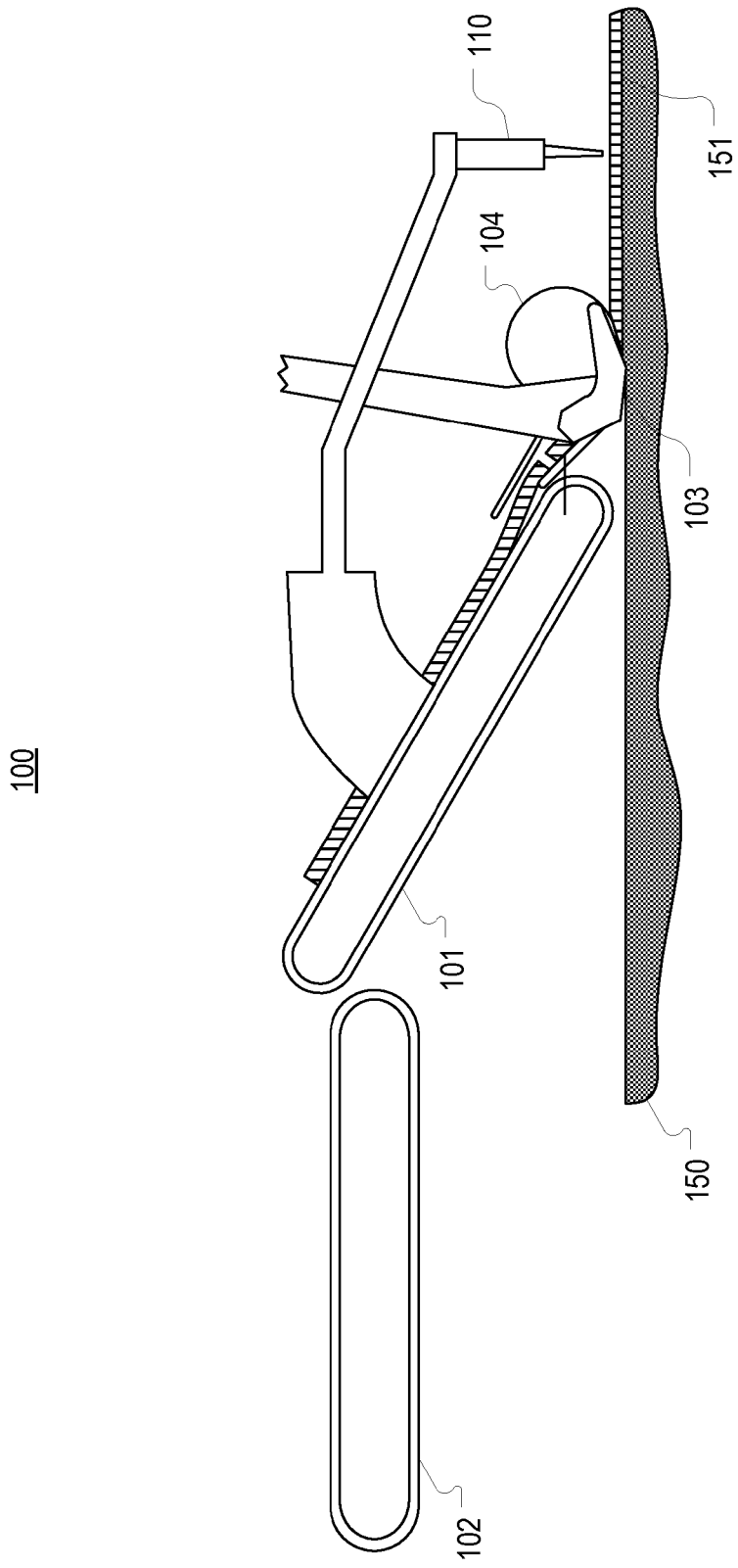
FIG. 1 illustrates an example of various components of a typical sod harvesting machine.
Figure 2A:
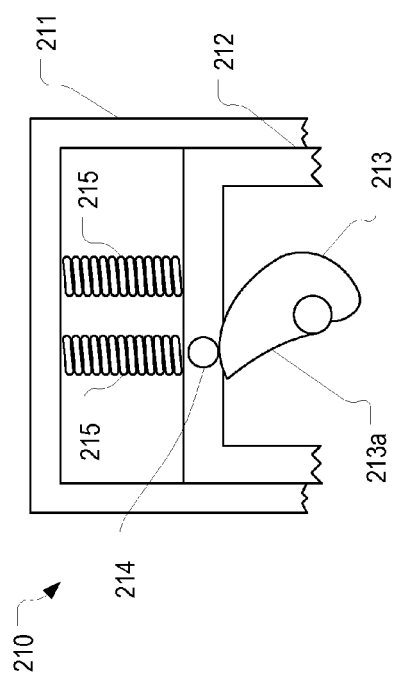
FIGS. 2A-2D illustrate a sequence of positions through which a cam rotates to cause a chop frame to perform a chopping action.
Figure 2B:
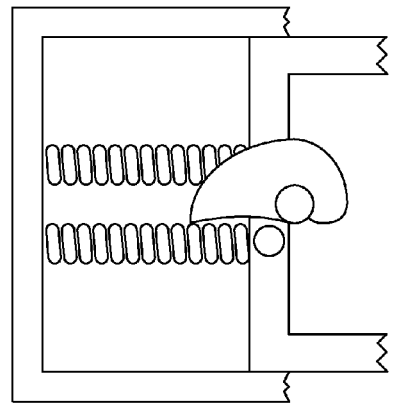
Figure 2C:
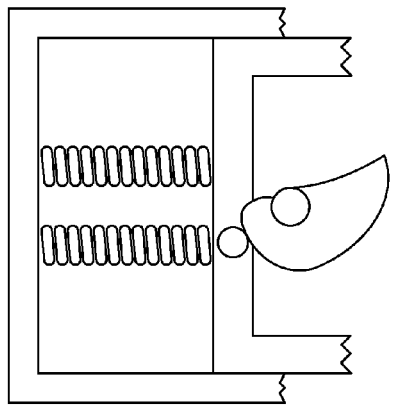
Figure 2D:
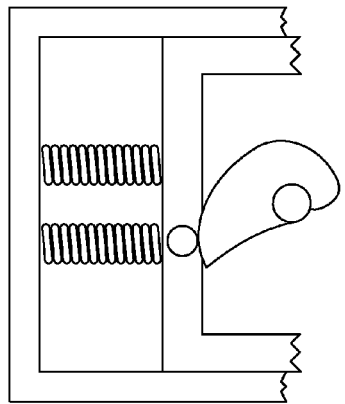
Figure 3:
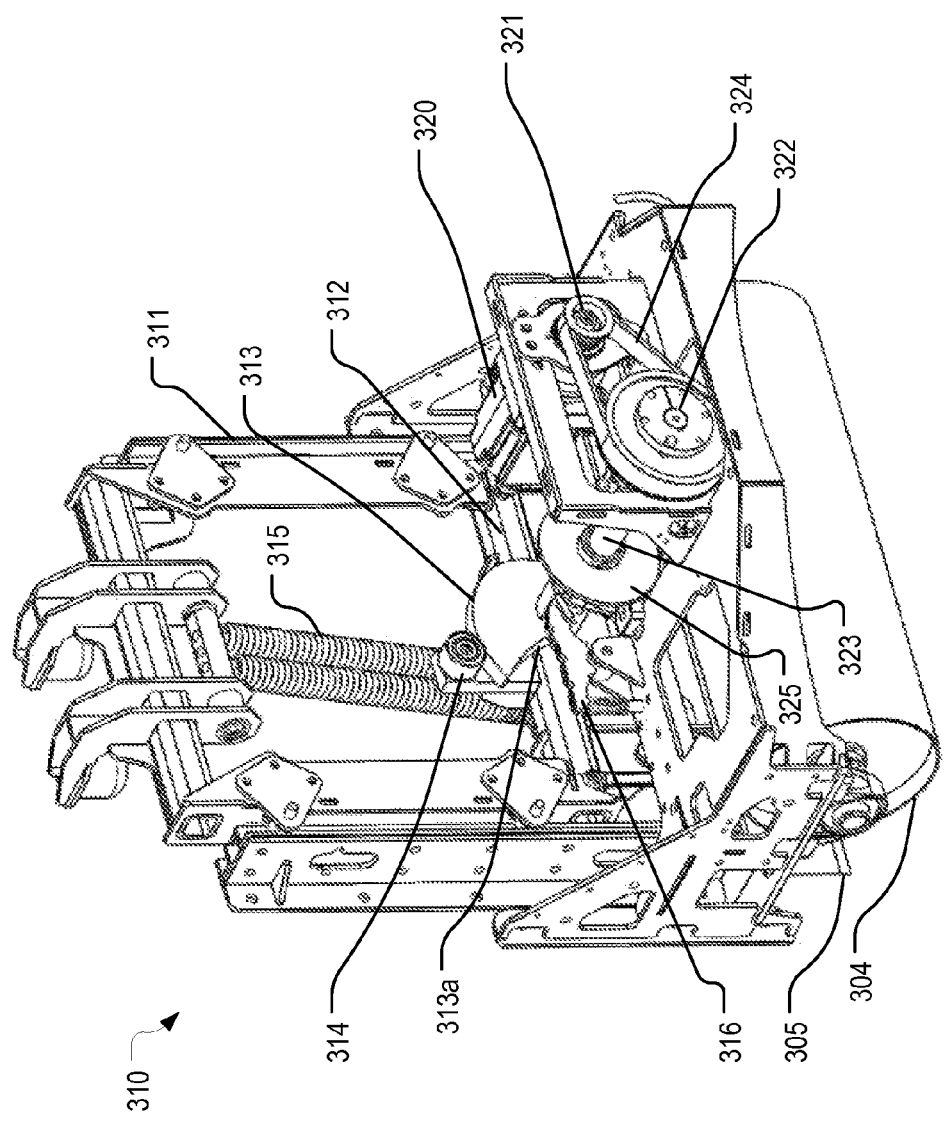
FIG. 3 illustrates an example implementation of a chop mechanism in accordance with one or more embodiments of the present invention.
Figure 4:
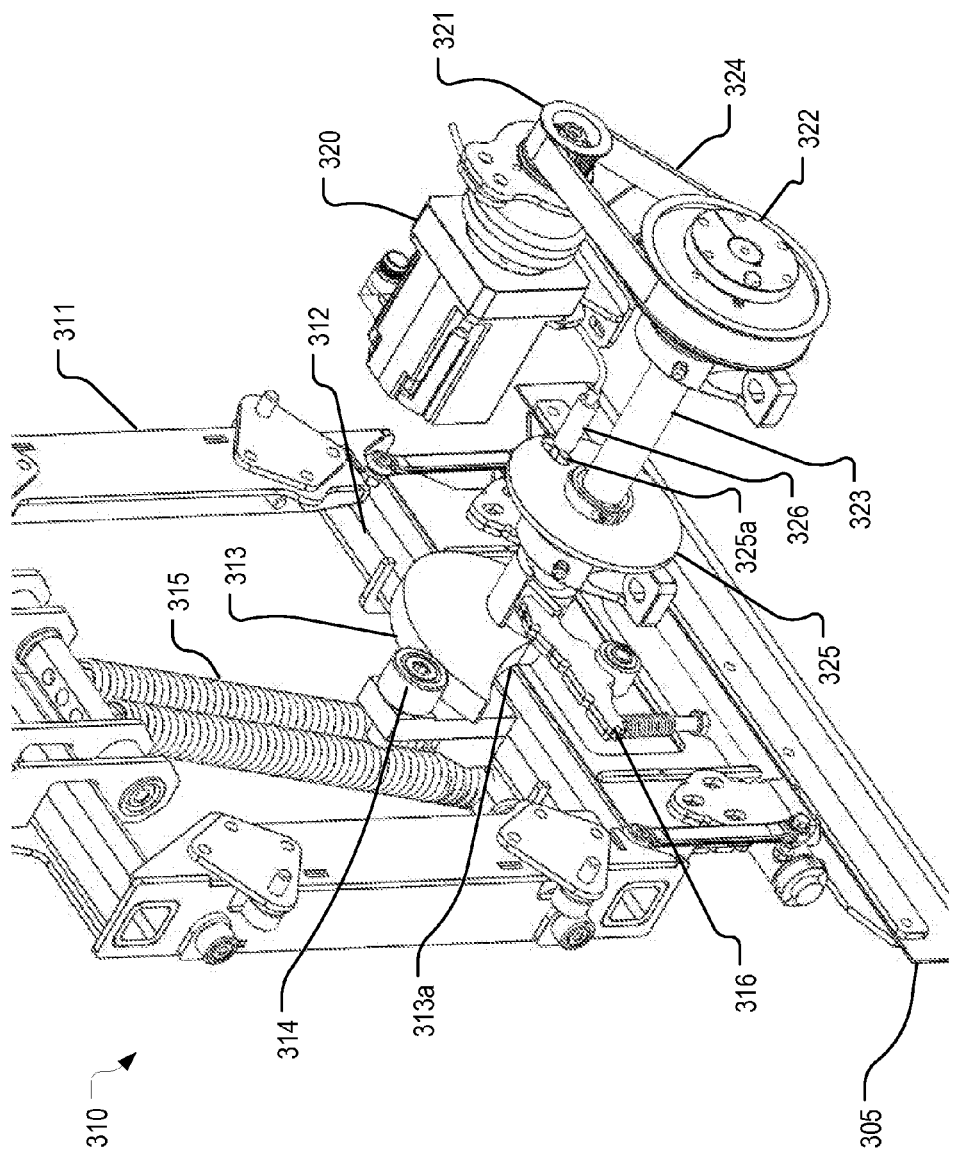
FIG. 4 illustrates various components of the chop mechanism depicted in FIG. 3.

FIGS. 3 and 4 depict a chop mechanism 310 in accordance with one or more embodiments of the present invention. Chop mechanism 310 includes a fixed frame 311, a chop frame 312, a cam 313, a follower 314, and springs 315 that function in a similar manner as described above with reference to FIGS. 2A-2D. In particular, as cam 313 is rotated in a clockwise direction, follower 314 is lifted thereby lifting chop frame 312 to load springs 315. Cam 313 includes a flat edge 313a which causes follower 314 to be dropped once cam 313 reaches the drop point. A blade 305 is attached at the bottom of chop frame 312 and is configured to insert into the ground under the force of springs 315 when follower 314 is dropped. In FIG. 3, cam 313 is shown in the ready position. A latch 316 can be configured to prevent counterclockwise rotation of cam 313 once cam 313 has reached this ready position.

Cam 313 can be coupled to a shaft 323 that is driven by a motor 320. Motor 320 and shaft 323 can be positioned in a parallel configuration as shown in FIG. 3. In such configurations, an axle 321 of motor 320 can be coupled to a gear reducer 322 connected to the end of shaft 323 via a drive belt 324.

Chop mechanism 310 can also include one or more sensors for providing position information for use by a control unit (not shown) in controlling the operation of motor 320. This position information can identify a rotational position of cam 313. The control unit can use this position information to control motor 320 so that cam 313 is started and stopped (or slowed) in the appropriate positions during a chopping action as will be further described below.

The one or more sensors can be positioned at various locations of chop mechanism 310 to obtain this position information. For example, in the embodiment depicted in FIGS. 3 and 4, a plate 325 is secured to shaft 323 and includes an opening 325a which is sensed by sensor 326. Each time plate 325 reaches the position shown in FIGS. 3 and 4, which corresponds to the ready position of cam 313, sensor 326 can detect the opening 325a and provide a signal to the control unit. The control unit can employ this signal to dynamically control motor 320 as will be further described below.

The position of sensor 326 is only one example of a suitable position for the one or more sensors. A sensor may also be placed on or near chop frame 312 or follower 314 to detect the vertical position of the chop frame or follower since this vertical position is directly related to the rotational position of cam 313. Also, rather than employing plate 325, a sensor may be positioned adjacent cam 313 so as to directly detect the rotational position of cam 313. One benefit of employing a separate plate 325 is that sensor 326 can be positioned away from the components of chop mechanism 310 that move harshly in the vertical direction thereby minimizing the likelihood that the sensor will be damaged during a chopping action.

In some embodiments, motor 320 can be configured to provide the position information. In other words, motor 320, whether electric or hydraulic, can provide feedback (e.g., via an encoder) which indicates a degree of rotation that the motor has traversed. In some embodiments, this feedback can be in the form of a counter where each increment of the counter corresponds with a specified degree of rotation. Because the rotation of motor 320 is directly related to the position of cam 313, the control unit can employ position information generated by motor 320 to control motor 320 to cause cam 313 to be started and stopped in the desired positions during a chopping action.

In accordance with one or more embodiments of the present invention, the control unit can control motor 320 to cause cam 313 to advance from a ready position, through a drop position, and then stop (or slow its rotation) at a safe position to await the descent of chop frame 312. After chop frame 312 has fully descended, the control unit can control motor 320 to cause cam 313 to advance from the safe position back to the ready position to await a subsequent chopping action. In some embodiments, the advancing of the cam from the ready position to the safe position and from the safe position to the ready position can be performed at different speeds.

This rotational sequence will be described with reference to FIGS. 5A-5D. FIGS. 5A-5D are similar to FIGS. 2A-2D however, FIGS. 5A-5D also represent how the control unit can employ position information to stop (or slow) cam 313 at the safe position. FIGS. 5A-5D represent an embodiment where sensor 326 and plate 325 are used to generate the position information. However, a similar rotational sequence can be achieved when the position information is generated by a sensor in a different location (e.g., one that detects the vertical position of chop frame 312) or when motor 320 generates the position information.

In FIG. 5A, cam 313 has been rotated to the ready position. Accordingly, sensor 326 is aligned with opening 325a of plate 325. Once sensor 326 is aligned with opening 325a, sensor 326 outputs position information that indicates that cam 313 has reached the ready position.

By knowing that cam 313 is in the ready position, and by knowing how far cam 313 must be rotated to reach the safe position, the control unit can accurately control the rotation of cam 313 to position the cam in the safe position at the appropriate time. The safe position can be any rotational position after the drop position and before a position where chop frame 312 would strike cam 313 during its descent. An example of a safe position is shown in FIG. 5B. In some cases, the safe position and the drop position can be substantially the same position. In other cases, the shape of cam 313 may allow the safe position to be a position after the drop position.

The control unit can be configured to include information that defines an amount of rotation of motor 320 that is required to rotate cam 313 a specified amount. For example, the control unit can include information that defines that 1000 degrees of rotation of motor 320 are required to rotate cam 313 from the ready position to the safe position. Using such information along with the position information received from the one or more sensors or motor 320, the control unit can instruct motor 320 to advance from the ready position (e.g., the position shown in FIG. 5A) to the safe position (e.g., the position shown in FIG. 5B) where rotation is stopped momentarily.

The rotation of cam 313 can be stopped for a sufficient duration to allow follower 314 to fully descend. Then, once follower 314 has fully descended, the control unit can cause cam 313 to commence rotating from the safe position towards the ready position as shown in FIGS. 5C and 5D. The control unit can also employ the position information when rotating cam 313 back to the ready position. For example, by knowing the position information that identified the previous ready position of cam 313, the amount of rotation that motor 320 made to cause cam 313 to reach the safe position, and the amount of rotation of motor 320 required to complete one full rotation of cam 313, the control unit can instruct the motor to advance the appropriate number of rotations to again reach the ready position.

In some embodiments, rather than employing knowledge of the amount of rotation of motor 320 required to rotate cam 313 from the ready position to the safe position, one or more sensors may be employed to generate position information identifying when cam 313 has reached the safe position. For example, an additional opening (not shown) could be included in plate 325 that corresponds with the safe position. Sensor 326 (or another sensor) could be configured to output a signal when this additional opening is aligned with the sensor. This signal, when detected by the control unit, can indicate that cam 313 has reached (or is about to reach) the safe position. In response, the control unit can cause motor 320 to stop rotating so that cam 313 stops momentarily in the safe position. A similar process could be employed when rotating cam 313 from the safe position to the ready position.

In some embodiments, the control unit can cause cam 313 to be rotated from the ready position to the safe position at a first, slower rate and then from the safe position to the ready position at a second, faster rate. The use of these two rates can facilitate chopping at high frequencies. In particular, the first, slower rate can be employed to ensure that cam 313 reaches the drop position at the precise time and is then able to stop at the safe position, while the second, faster rate can be employed to quickly return cam 313 to the ready position after it has been stopped. In this manner, a chopping action can be performed at high frequencies to enable a sod harvester to be operated at high ground speeds even while cutting slabs of relatively short length/width.

In some embodiments, it may be desirable to use a first and a second rate that are sufficient to allow cam 313 to not be stopped in the safe position. For example, there may be cases where cam 313 can be advanced from the ready position to the safe position at a rate that is slow enough that follower 314 will not strike cam 313 even without stopping cam 313. Accordingly, the present invention extends to embodiments where cam 313 is advanced from the ready position to the safe position and then back to the ready position at variable rates even if the cam is not stopped at the safe position.

In some embodiments, in conjunction with receiving a signal indicative of cam 313's rotational position, the control unit can also receive current rotational information from motor 320 and correlate this rotational information with the signal, or, in other words, identify that the current rotational information represents the ready position of cam 313. By creating this association between the ready position and the current rotational information (or position) of motor 320, the control unit can then instruct motor 320 to advance in particular increments to complete a chopping action.

More specifically, by knowing how the rotational position (e.g., degrees of rotation) of motor 320 map to the position of cam 313, a control unit can precisely control further rotation of motor 320 to ensure that cam 313 is positioned accurately. For example, with reference to FIGS. 5A-5D, if motor 320 provides feedback indicating a current rotational position of 2000 degrees when cam 313 is in the position shown in FIG. 5A and the control unit receives a signal from sensor 326 indicative of cam 313 being in this ready position, and the control unit is programmed to know that 1000 degrees of rotation of motor 320 equates to one complete rotation of cam 313, the control unit can instruct the motor to advance 1000 degrees to again reach the ready position as shown in FIG. 5D.

Because sensor 326 provides the signal each time cam 313 reaches the ready position (e.g., when in the positions shown in both FIGS. 5A and 5D), no errors between the programmed number of degrees to complete one cycle and the actual number of degrees to complete one cycle will be propagated. For example, if the control unit is programmed to use 1000 degrees of rotation as one complete rotation of cam 313, but the actual number of degrees to rotate from the position in FIG. 5A to the position shown in FIG. 5D is 999, this error of 1 degree will not be propagated since the starting point is reset at each cycle (e.g., upon reaching the position in FIG. 5D).

Further, in some embodiments, the control unit can be configured to repeatedly or periodically determine the number of degrees of rotation of motor 320 between the receipt of two signals from sensor 326. This determined number of degrees can then be used to control motor 320 in future chopping actions. For example, if the control unit determines that a previous chopping action required 999 degrees of rotation of motor 320, the control unit could instruct the motor 320 to advance 999 degrees from its current rotational position to complete the next chopping action.

The proper timing for commencing the chopping action (i.e., the timing for instructing motor 320 to commence rotating cam 313 from the ready position in FIG. 5A), can be determined based on one or more signals from one or more sensors that identify a ground position of the sod harvester. For example, a sensor may be configured to report a degree of rotation of roller 304, and the control unit can employ such information to cause motor 320 to commence rotation at the appropriate time to ensure that the resulting slab has the desired length/width.

As stated above, when chopping at high rates, cam 313 must be rotated at a relatively high speed in order to reach the ready position in time for the next chopping action. One problem with rotating cam 313 at a high speed is that cam 313 may be rotated into a position where follower 314 will strike the cam during its descent. For example, if cam 313 is rotated past the position shown in FIG. 5B prior to chop frame 312 fully descending, follower 314 may strike cam 313 with significant force leading to damage to or failure of cam 313 or follower 314.

In accordance with one or more embodiments of the present invention, cam 313 can be rotated at a variable speed to ensure that follower 314 does not strike cam 313 while also ensuring that cam 313 can return to the ready position in time for the next chopping action. Because the control unit can map the rotational position of cam 313 to the rotational information of motor 320, the control unit can instruct motor 320 to advance cam 313 in particular increments. For example, the control unit can instruct motor 320 to advance cam 313 from the ready position shown in FIG. 5A to the drop position shown in FIG. 5B and then wait for a specified amount of time prior to commencing rotation to the ready position shown in FIG. 5D.

As a particular example, assuming the control unit has mapped the ready position to motor 320's rotational position of 2000 degrees based on the receipt of the signal from sensor 326 and assuming that the drop position (or a position slightly after the drop position where follower 314 will not strike cam 313) corresponds with 250 degrees from rotation from the ready position (which may be programmed into the control unit's logic), the control unit can then instruct motor 320 to advance from the rotational position of 2000 degrees to a rotational position of 2250 degrees. The control unit may then delay a specified amount of time to allow chop frame 312 to fully descend and then instruct motor 320 to advance to the rotational position of 3000 degrees. In some embodiments, the initial rotation from the ready position to the drop point may occur at a slower rate while the subsequent rotation from the drop point to the ready position may occur at a faster rate. Alternatively, the control unit can instruct motor 320 to initially rotate at a slower rate (i.e., one that will ensure that follower 314 will not strike cam 313) and then speed up (i.e., without stopping) to ensure cam 313 reaches the ready position in time.

In some embodiments, the rotation of cam 313 can be stopped for a fixed amount of time prior to resuming rotation towards the ready position. In other embodiments, the rotation of cam 313 can be stopped until a signal is received indicating that follower 314 will no longer strike cam 313. This signal can be based on the position of chop frame 312. For example, a sensor can be configured to generate a signal once chop frame 312 has reached its unloaded position. This signal can also be based on a ground position of the sod harvester. For example, a sensor can be configured to generate a signal after the sod harvester has travelled a specified distance beyond a distance at which the chopping action was started. In other words, one or more sensors can be employed to indicate a ground distance when the chopping action should be started (which can result in cam 313 being rotated to the drop position and stopped), and to indicate a ground distance when the rotation of cam 313 should be resumed to position cam 313 in the ready position.

The ability to rotate cam 313 at different speeds and/or to start and stop cam 313 during the chopping action facilitates operating chopping mechanism 310 at a high frequency. In particular, cam 313 can be rotated initially at a slower rate and/or stopped to ensure that follower 314 does not strike cam 313 and then rotated at a fast rate to return to the ready position. This allows slabs of short length/width (e.g., 16 inches) to be cut with precision even at high ground speeds.

In some embodiments, motor 320 can be an electric motor. An electric motor can be preferred because of its ability to be advanced with precision in the manners described above. Additionally, an electric motor is less susceptible to performance variations due to environmental conditions. In other embodiments, however, motor 320 can be a hydraulic motor.

Figure 6:
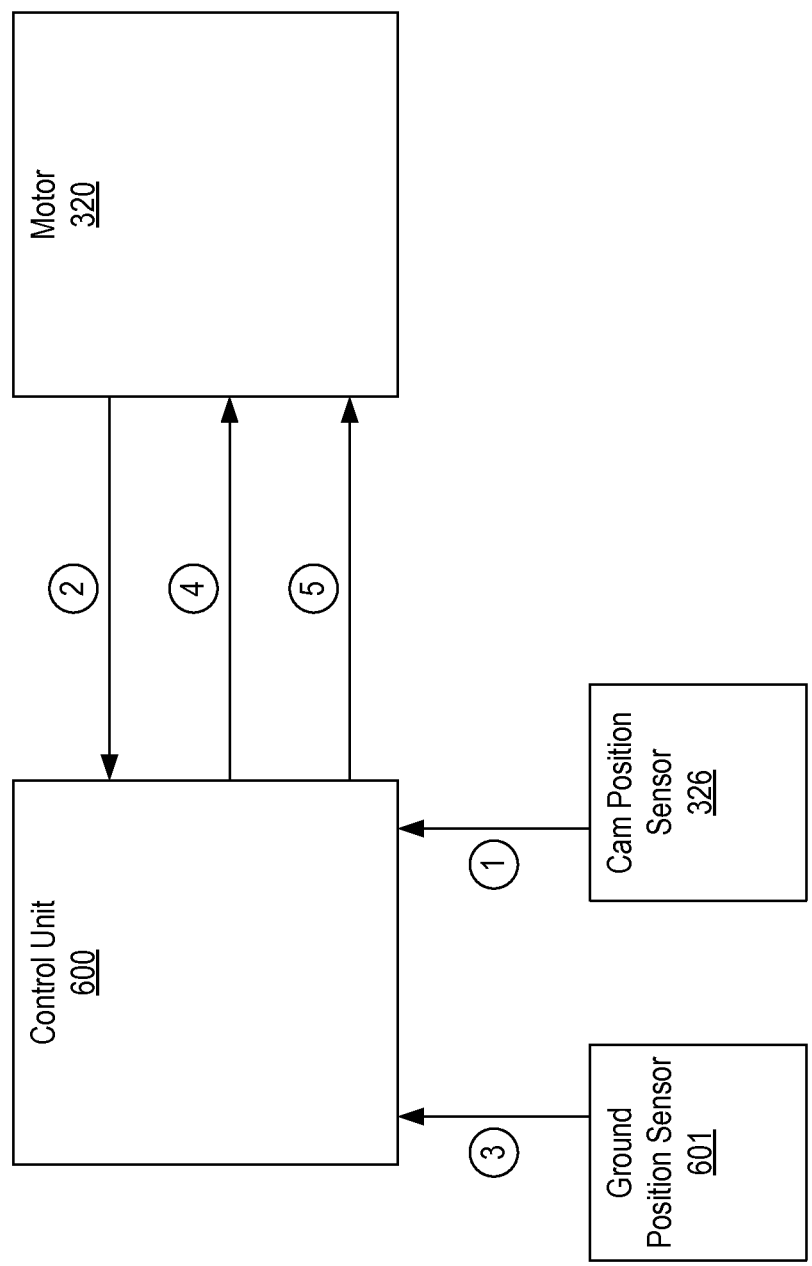
FIG. 6 provides a flow diagram illustrating various inputs and outputs of a control unit for controlling the advancement of an electric motor that drives the cam.

FIG. 6 provides a flow diagram illustrating a sequence of inputs and outputs of a control unit 600 for controlling motor 320. In this diagram, it will be assumed that a ground position sensor 601 is employed to identify a ground distance that the sod harvester has travelled. Also, although sensor 326 is used in this example, any other sensor that identifies a rotational position of cam 313 could also be used.

At time 1, it is assumed that cam 313 has rotated into the ready position and therefore sensor 326 provides a signal to control unit 600 indicative of cam 313's position. At time 2, which may be simultaneous with time 1 (or at least at a time prior to motor 320 again rotating after cam 313 has reached the ready position), control unit 600 receives rotational information from motor 320 (e.g., via an encoder) indicating the motor's current rotational position (e.g., a current value of a counter). Control unit 600 can then store an indication that this current rotational position of motor 320 corresponds with cam 313 being in the ready position.

At time 3, control unit 600 receives a signal from ground position sensor 601 indicating a current ground position of the sod harvester. Control unit 600 may store information identifying a ground position when a previous chopping action occurred and may use such stored information in conjunction with the signal received from ground position sensor 601 to identify a time when the next chopping action should occur.

At time 4, control unit 600 sends a control signal to motor 320 instructing motor 320 to advance a first number of rotations. For example, this first number of rotations may correspond with the required number of rotations of motor 320 to cause cam 313 to reach the drop position. In response to this control signal, motor 320 may advance the first number of rotations and then stop. In some embodiments, the control signal communicated at time 4 may include first speed information which defines how fast motor 320 should rotate through the first number of rotations.

At time 5, control unit 600 may again send a control signal to motor 320 instructing motor 320 to advance a second number of rotations. This second number of rotations can correspond with the required number of rotations of motor 320 to cause cam 313 to reach the ready position. In some embodiments, the control signal communicated at time 5 may include second speed information which defines how fast motor 320 should rotate through the second number of rotations. This second speed information can identify a speed that is faster than the speed identified by the first speed information such that motor 320 rotates to the drop point slower than it rotates to the ready position.

Figure 7:
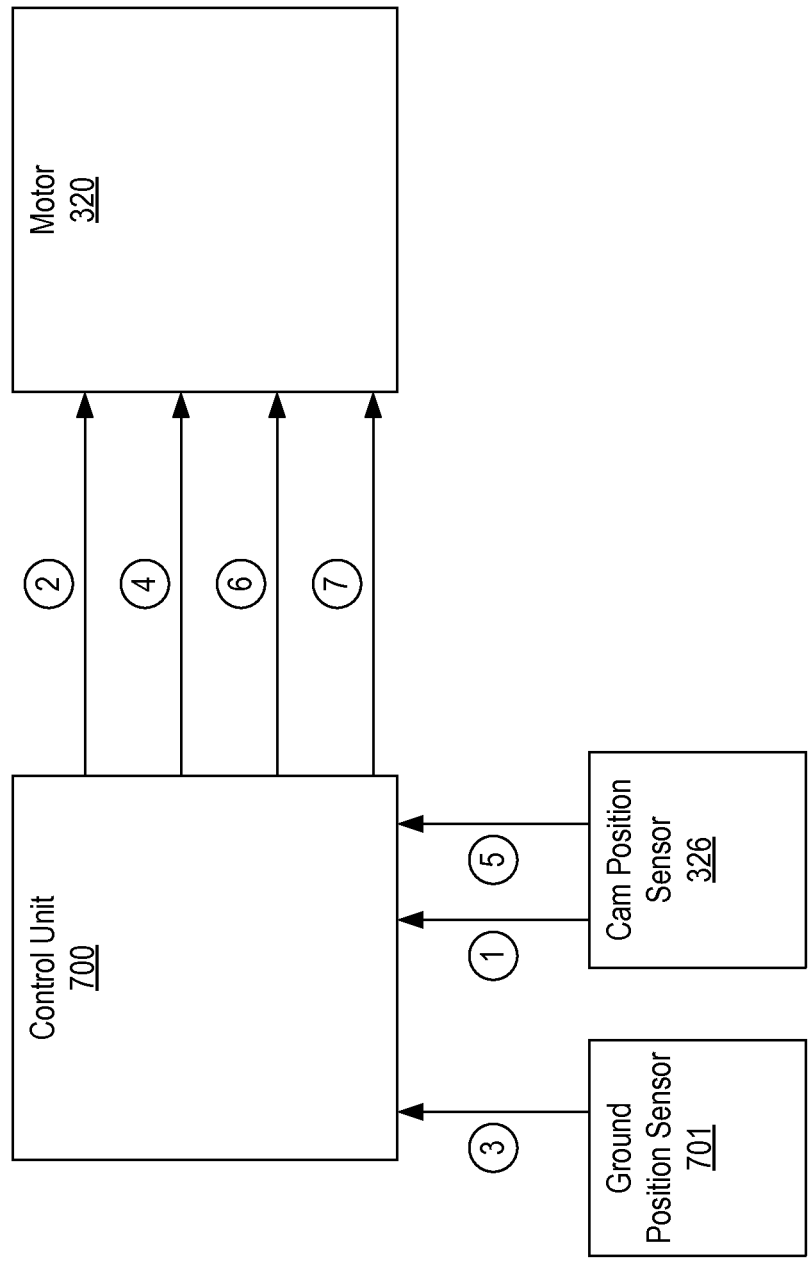
FIG. 7 provides another flow diagram illustrating various inputs and outputs of a control unit for controlling the advancement of an electric motor that drives the cam.

FIG. 7 provides a flow diagram illustrating another sequence of inputs and outputs of a control unit 700 for controlling motor 320. In the flow diagram of FIG. 7, control unit 700 receives three signals from sensors and employs these signals to instruct motor 320 to start and stop (or slow) at the appropriate times. Although a single cam position sensor 326 is shown as outputting signals at times 1 and 4, separate sensors could be employed to output these signals.

At time 1, sensor 326 outputs a first signal indicating that cam 313 has reached the ready position. Control unit 700 can employ this signal to instruct motor 320, at time 2 (which may be simultaneous with time 1), to stop thereby retaining cam 313 in the ready position until a chopping action should begin.

At time 3, ground position sensor 701 provides a signal to control unit 600 indicating that the sod harvester has travelled a specified distance. Control unit 700 can employ this signal to instruct, at time 4 (which may be simultaneous with time 3), motor 320 to start rotating to cause cam 313 to advance to the drop position. This instruction can include a first rate at which motor 320 should rotate.

At time 5, sensor 326 provides another signal that indicates that cam 313 has rotated to the safe position. For example, this signal can be generated based on sensor 326 detecting an opening in plate 325 that corresponds with cam 313 being in the safe position. Alternatively, this signal could be generated based on another sensor identifying that cam 313 has reached the safe position. Control unit 700 can employ this signal, at time 6 (which may be simultaneous with time 5), to instruct motor 320 to stop rotating thereby maintaining cam 313 in the safe position. Alternatively, this instruction can cause motor 320 to slow its rotation rather than stopping it.

At time 7, control unit 700 provides another instruction to motor 320 to cause motor 320 to commence rotating (or to speed up if rotation was not stopped at time 6). This instruction can include a second rate at which motor 320 should rotate. The second rate may be faster than the first rate provided at time 4. In response, motor 320 can rotate to cause cam 313 to return to the ready position from which the process will be repeated.

The flow diagrams of FIGS. 6 and 7 illustrate that various different techniques and configurations can be employed to cause cam 313 to be stopped (or slowed) in the safe position. The sequences in FIGS. 6 and 7 are intended to serve as examples only and should not be construed as limiting the invention.

Figure 8:
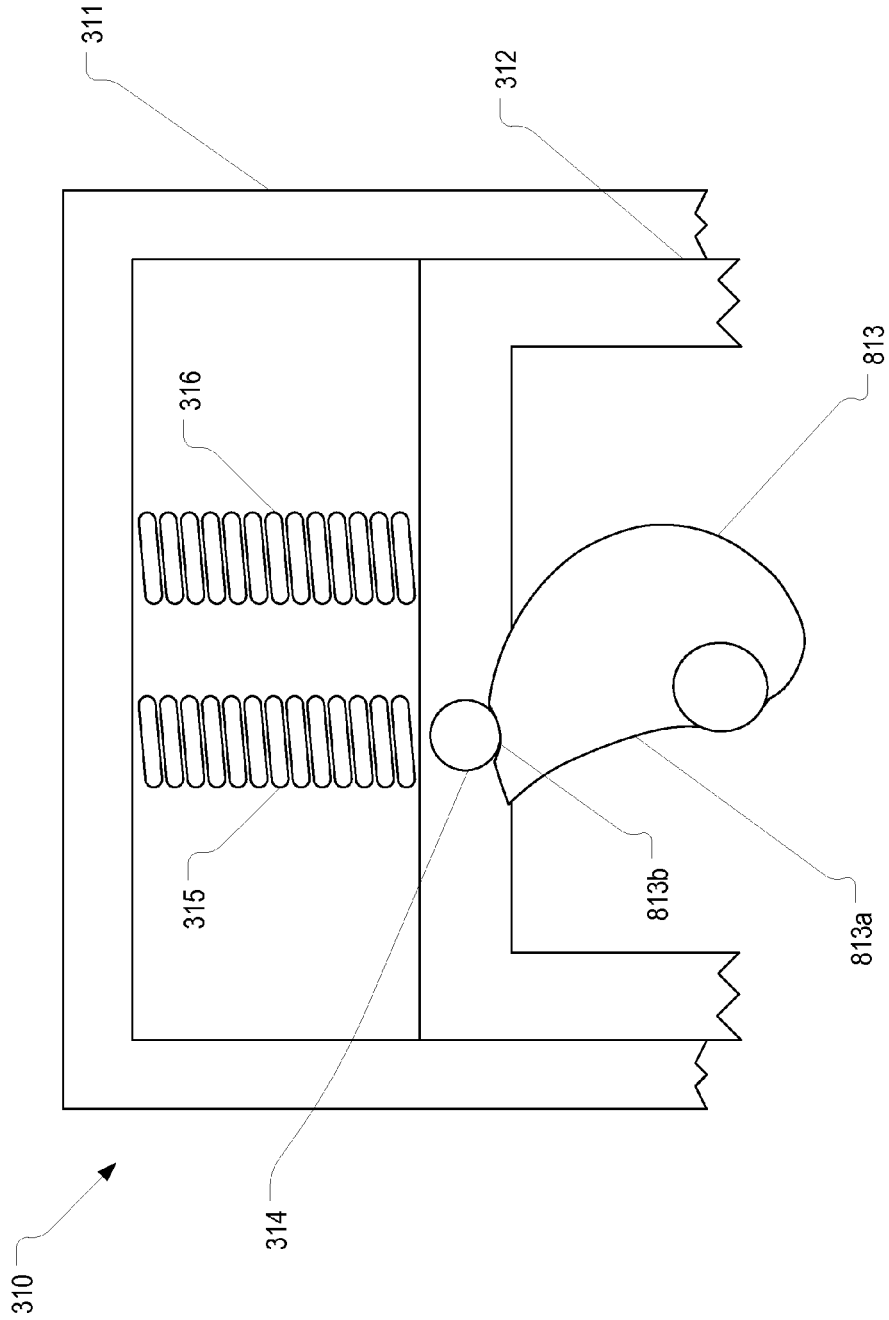
FIG. 8 illustrates an alternate embodiment of a cam that includes a groove to eliminate the need for a latch.

FIG. 8 illustrates an alternate configuration of a cam 813 that can be used in chop mechanism 310. Cam 813 has a similar shape as cam 313 except that cam 813 includes a groove 813*b* in which follower 314 sits when cam 813 is in the ready position. Groove 813*b* can be shaped and positioned so that the force applied by follower 314 on cam 813 is balanced in a downward direction. In other words, the configuration of groove 813*b* can ensure that the force applied by follower 314 will not cause cam 813 to rotate in the reverse direction (which in this case is counterclockwise). As a result, chop mechanism 310 will not require a latch to maintain cam 813 in the ready position.

In addition to preventing cam 813 from rotating in the reverse direction, groove 813*b* can also serve as a means for identifying the ready position of cam 813. In particular, the control unit can be configured to monitor the torque of motor 320 as it rotates. As cam 813 reaches the point where follower 314 drops into groove 813*b*, a unique change in the torque will occur. The control unit can be configured to detect this unique change as the indication that cam 813 is in the ready position. Therefore, in embodiments where cam 813 is used, sensor 326 may not be required to identify the ready position of cam 813. In such embodiments, changes in the torque may also be employed to identify the safe position. In particular, as follower 314 is dropped, a second unique change in the torque will occur. The control unit can detect this second unique change, and in response, cause motor 320 to stop rotating momentarily. Accordingly, the present invention extends to embodiments where the position of the cam is determined by monitoring variations in the torque on the motor.

In embodiments that employ a hydraulic motor, chop mechanism 310 can also include one or more sensors for sensing the temperature of the hydraulic fluid used to power motor 320. As described in the Background, variations in the temperature of the hydraulic fluid can alter the delays inherent in a hydraulic system thereby making it more difficult to accurately control the position of cam 313. In accordance with one or more embodiments of the present invention, the control unit can be configured to receive one or more signals which identify a temperature of the hydraulic fluid. The control unit can then vary the timing offsets used to control the rotation of cam 313 to account for the variations in the delay caused by the variations in the temperature.

For example, the control unit can maintain a mapping between various temperatures of the hydraulic fluid and the corresponding delays. The control unit can then use these mappings to determine the appropriate timing offsets given the current temperature of the hydraulic fluid.

These variable timing offsets can be used in each case when the rotation of cam 313 is started or stopped. For example, the control unit can identify an appropriate timing offset for starting the rotation of cam 313 from the ready position and for stopping the rotation of cam 313 to reach the ready position based on the current temperature of the hydraulic fluid. Similarly, the control unit can identify an appropriate timing offset for stopping rotation of cam 313 after reaching the safe position and then for resuming the rotation to return to the ready position. This dynamic adjustment to the timing offsets can ensure that cam 313 is in the appropriate position throughout the chopping action so that slabs are cut to the desired length/width, follower 314 does not strike cam 313, cam 313 does not overrun or underrun the ready position, and cam 313 reaches the ready position in time for the next chopping action.

With reference to FIG. 7, dynamic timing offsets based on the temperature of the hydraulic fluid can be used to determine times 2, 4, 6, and 7. To enable such adjustments to these times 2, 4, 6, and 7, sensors 326 and 701 can be configured to generate signals early. For example, sensor 326 can be configured such that time 1 occurs slightly before cam 313 reaches the ready position. Control unit 700 will therefore have time to determine the exact moment when motor 320 should be instructed to stop based on the dynamic timing offset. In this way, the variable delays caused by different temperatures of the hydraulic fluid can be accounted for to ensure that cam 313 stops in the desired position or reaches the desired position (e.g., the drop position) at the appropriate time.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A chop mechanism for a sod harvester comprising:
   a fixed frame;
   a chop frame that is configured to move within the fixed frame, the chop frame including a blade that inserts into the ground as the chop frame moves within the fixed frame;
   a follower secured to the chop frame;
   a cam positioned to contact the follower as the cam is rotated thereby lifting the chop frame, the cam including a flat edge which causes the follower to be dropped when the cam is rotated to a drop position, the cam having a ready position in which the cam is positioned prior to a chopping action and a safe position in which the follower will not strike the cam while the follower descends during the chopping action;
   a motor for rotating the cam; and
   a control unit configured to receive position information identifying a rotational position of the cam, the control unit further being configured to employ the position information to generate a first control signal to cause the cam to rotate from the ready position to the safe position, and a second control signal to cause the cam to rotate from the safe position to the ready position.

2. The chop mechanism of claim 1, wherein the first control signal causes the cam to stop rotating once the cam reaches the safe position.

3. The chop mechanism of claim 1, wherein the motor is an electric motor.

4. The chop mechanism of claim 1, wherein the motor is a hydraulic motor.

5. The chop mechanism of claim 4, wherein the first control signal includes a first instruction to cause the motor to start rotating and a second instruction to cause the motor to stop rotating.

6. The chop mechanism of claim 5, wherein a timing of the first instruction and a timing of the second instruction are based on a temperature of hydraulic fluid used to rotate the hydraulic motor.

7. The chop mechanism of claim 1, wherein the motor generates the position information.

8. The chop mechanism of claim 1, further comprising: a sensor that generates the position information.

9. The chop mechanism of claim 8, wherein the sensor detects a rotational position of the cam.

10. The chop mechanism of claim 8, wherein the cam is mounted on a shaft, the chop mechanism further comprising:
    a plate mounted on the shaft, the sensor being positioned adjacent the plate to generate the position information based on a rotational position of the plate.

11. The chop mechanism of claim 10, wherein the plate includes an opening, the sensor generating the position information when the sensor is aligned with the opening.

12. A chop mechanism for a sod harvester comprising:
    a fixed frame;
    a chop frame that is configured to move within the fixed frame, the chop frame including a blade that inserts into the ground as the chop frame moves within the fixed frame;
    a follower secured to the chop frame;
    a cam positioned to contact the follower as the cam is rotated thereby lifting the chop frame, the cam including a flat edge which causes the follower to be dropped when the cam is rotated to a drop position;
    an electric motor for rotating the cam; and
    a control unit configured to output control signals for controlling the rotation of the electric motor based on a position of the cam.

13. The chop mechanism of claim 12, wherein the control unit is configured to receive position information that identifies the position of the cam.

14. The chop mechanism of claim 13, wherein the position information is generated by one or more sensors.

15. The chop mechanism of claim 13, wherein the position information is generated by the electric motor.

16. The chop mechanism of claim 12, wherein the control signals include a first control signal for causing the electric motor to advance the cam from a ready position to a safe position, and a second control signal for causing the electric motor to advance from the safe position to the ready position.

17. The chop mechanism of claim 16, wherein the first control signal causes the electric motor to advance at a first rate and the second control signal causes the electric motor to advance at a second rate, the second rate being faster than the first rate.

18. A method performed by a control unit of a sod harvester for controlling the rotation of a cam during a chopping action, the method comprising:
    receiving a first signal indicative of the cam being in a ready position;
    receiving a second signal indicative of a ground position of the sod harvester;
    generating a first control signal for controlling a motor used to drive the cam, the first control signal causing the motor to rotate the cam through a drop position in which a follower is dropped by the cam to a safe position in which the follower will not strike the cam as the follower drops; and
    generating a second control signal for controlling the motor, the second control signal causing the motor to rotate the cam from the safe position to the ready position.

19. The method of claim 18, wherein the first control signal causes the cam to be rotated at a first rate and the second control signal causes the cam to be rotated at a second rate.

20. The method of claim 18, wherein the first control signal causes the cam to stop rotating once the cam reaches the safe position.

* * * * *